Figure 1:
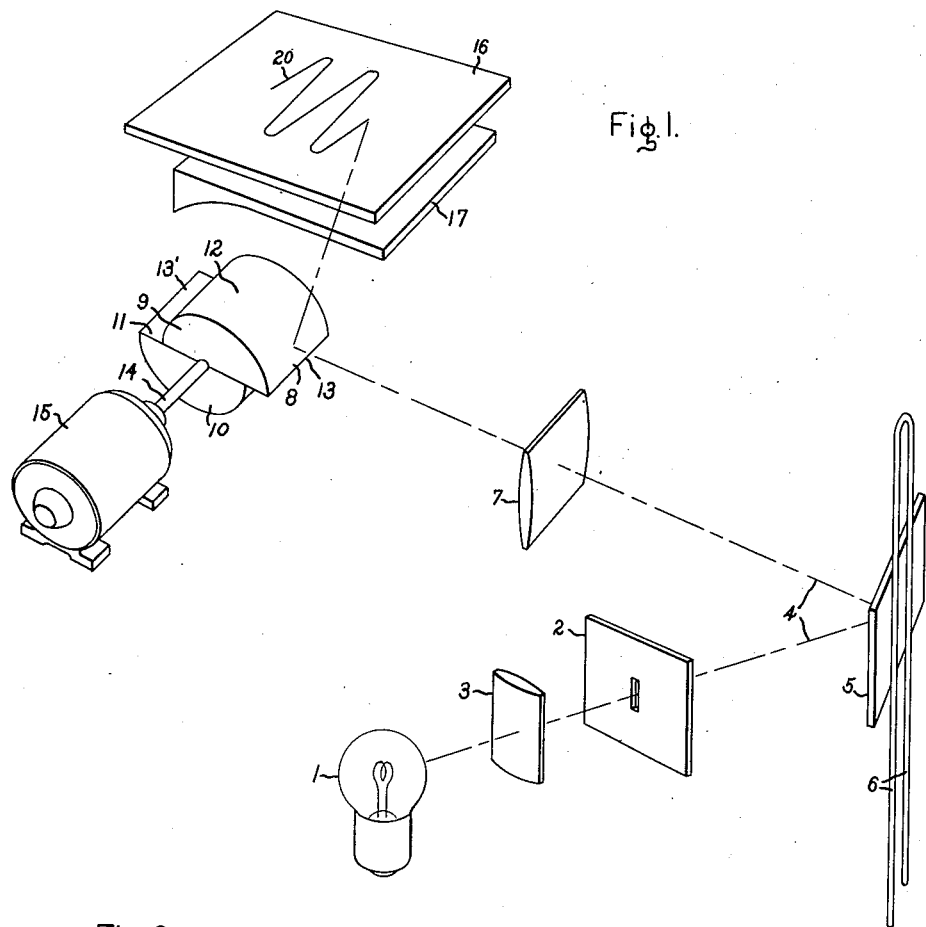

Oct. 19, 1954    K. R. GEISER    2,692,369
OPTICAL SYSTEM FOR OSCILLOGRAPHS
Filed Dec. 17, 1949    2 Sheets-Sheet 1

Inventor:
Kenneth R. Geiser,
by Paul A. Frank
His Attorney.

Oct. 19, 1954

K. R. GEISER 2,692,369

OPTICAL SYSTEM FOR OSCILLOGRAPHS

Filed Dec. 17, 1949

2 Sheets-Sheet 2

Inventor:
Kenneth R. Geiser,
by Paul A. Frank
His Attorney.

Patented Oct. 19, 1954

2,692,369

UNITED STATES PATENT OFFICE 2,692,369

OPTICAL SYSTEM FOR OSCILLOGRAPHS

Kenneth R. Geiser, Schenectady, N. Y., assignor to General Electric Company, a corporation of New York Application December 17, 1949, Serial No. 133,581

2 Claims. (Cl. 324—97)

My invention relates to oscillographs and more particularly to light cams for producing linear and periodic light beam deflection for use in oscillographs of the type employing a beam of light as the recording medium.

In many oscillographs of this optical type a beam of light is deflected along one axis of a pair of Cartesian coordinates in accordance with an applied voltage function and means are included whereby the resultant variations of the light beam are simultaneously deflected along the associated coordinate axis in order to provide a time base against which the applied voltage may be viewed.

Many difficulties, however, have been encountered in providing a simple and economical device which will cause a suitable time base deflection of this light beam. In order to facilitate the harmonic analysis of a resultant voltage wave, it is commonly desired that the rate of time base deflection be held substantially constant to provide a linear time base. It is also highly desirable that the "fly-back time" between each sweep of time base deflection be extremely short in order to provide a delineation of substantially the entire applied voltage function. In addition, the rate and positon of each successive sweep of time base deflection should be uniform in order to prevent the production of an objectionable shift or flutter in the resultant trace.

Most time base deflecting devices which have heretofore been devised have not been able to fulfill all of these requirements adequately. Devices which employ the oscillation of a flat mirror, for example, to cause a time base deflection of an incident light beam have a comparatively long fly-back time because of the mechanical inertia involved in accelerating return of the mirror to its initial position. In other optical deflection devices which employ a rotating, many-sided polygon of flat mirrors in order to provide a rapid succession of time base sweeps, the resultant trace often appears to shift or flutter due to the difficulty of assembling the polygon of mirrors so that angles between all adjacent mirrors are exactly equal. In addition, a polygon of mirrors of this type is also quite difficult and expensive to construct and relatively easy to break.

Accordingly, one object of my invention is to provide a new and improved optical system for an oscillograph.

Another object is to provide a time base deflection system for an optical type oscillograph which has an extremely short fly-back time.

Another object of my invention is to provide a light beam time base deflecting device for the above type oscillograph which causes each successive sweep of time base deflection to occur at a uniform rate and to fall in an identical position.

A further object of my invention is to provide a time base deflecting device for an optical type oscillograph whose construction can be easily modified to provide a linear or non-linear rate of time base deflection upon either a flat or a curved light sensitive medium.

A still further object of my invention is to provide a comparatively rugged time base deflecting device for an optical oscillograph which is simple and economical to construct.

One of the principal features of my invention is a light beam deflecting cam comprising a pair of convex mirrors which are shaped in the form of identical cylinder segments and joined in an offset back-to-back manner so that their longitudinal center lines do not coincide. This light cam is rotated about a longitudinal axis parallel to the longitudinal elements of the cylinder segments which is located midway between the said two center lines. A light beam which is incident upon the cam from a predetermined direction is deflected at continuously varying angles of reflection by the continually changing curvature of the mirrors at the point of incidence. Since the two halves of the cam are identically constructed and similarly mounted with respect to the axis of rotation, an identical sweep of light beam deflection is produced during each half revolution of the cam. A light sensitive medium, such as a recording film or a viewing screen, may be arranged to receive this deflected light beam. If the light cam is rotated at a sufficiently high speed, the resultant trace appears to be continuous.

Figure 2:
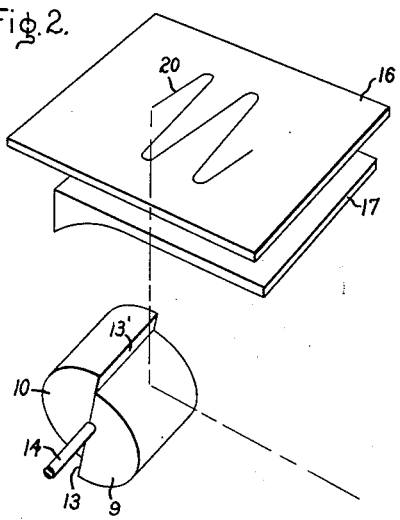
Figure 3:
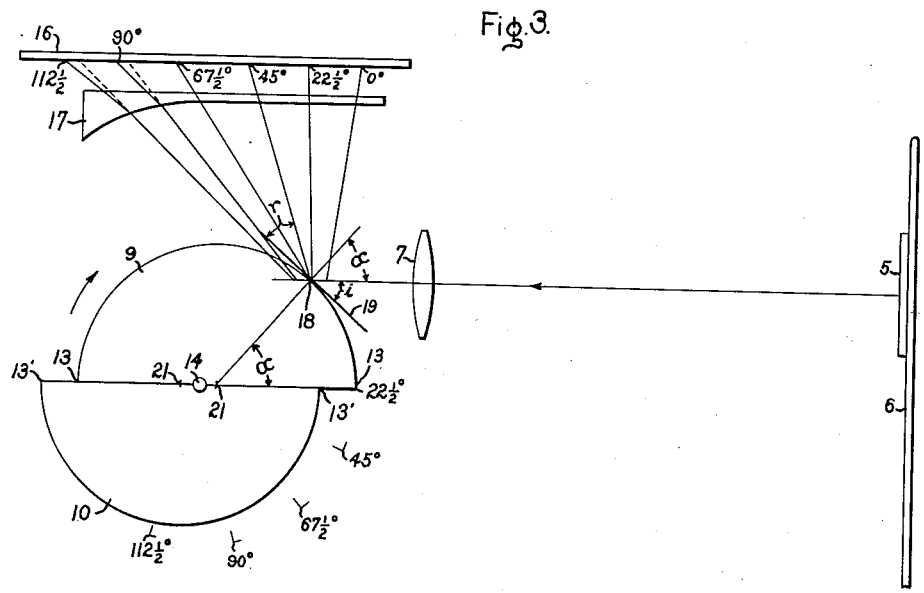
Figure 4:
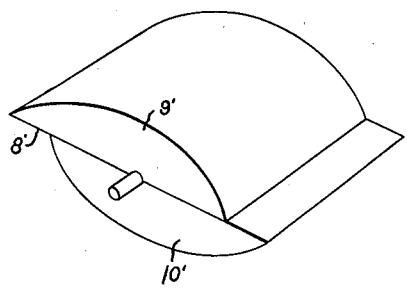

The novel features which I believe to be characteristic of my invention are set forth with particularity in the appended claims. My invention itself, however, together with further objects and advantages thereof can best be understood by reference to the following description taken in connection with the accompanying drawing in which Fig. 1 is a perspective view of an oscillograph optical system embodying my invention; Fig. 2 is a similar perspective view of the light cam and viewing screen included in the optical system of Fig. 1 illustrating the time base deflection resulting from a movement of the light cam; Fig. 3 is a schematic side view of the optical system of Fig. 1 showing a typical deflection pattern caused by the rotation of the light cam of Fig. 1; and Fig. 4 is a perspective view of a modification of the construction of the light cam of Fig. 1 whereby certain other desired deflection patterns may be obtained.

Referring to Fig. 1, I have shown an oscillograph optical system comprising a light source such as lamp 1, a light directing means such as an apertured plate 2 and a light converging lens 3 which are arranged to provide a beam of light such as schematically indicated by the dashed lines 4. This beam of light 4 impinges upon a galvanometer mirror 5 which is arranged on galvanometer leads 6 to be oscillated by a galvanometer in response to a voltage function supplied to the galvanometer. The galvanometer and the galvanometer mirror may be any conventional type commonly employed in optical oscillographs.

The light beam 4 reflected from the mirror 5 is deflected in a well-known manner by the oscillation of the mirror 5 to move within a particular plane of deflection, such as the horizontal. A second light converging lens 7 is preferably arranged to intercept this reflected light beam 4 and to transmit the beam upon a light cam 8, as will be more fully explained hereinafter.

The light cam 8 comprises a pair of identical convex mirrors 9 and 10 joined in an offset back-to-back manner as illustrated. Each mirror 9, 10 is constructed of glass or any other suitable material having a light-reflecting surface, preferably a highly polished surface, and shaped in the form of a longitudinal segment or portion of a cylinder. Each mirror 9, 10 preferably has a flat back 11, appearing as a chord of a circle in cross-section or end view as shown in Fig. 3, and an arcuate silvered outer surface 12 covered with a thin coating of transparent protective material such as silicon monoxide, although the mirrors may alternatively be constructed as transparent hollow tube segments silvered on the inside. The mirrors are joined so that their respective longitudinal edges 13 and 13' are parallel and in the same plane but do not coincide. Although in Fig. 1, I have illustrated the mirrors 9 and 10 as being shaped in the form of half cylinders, it will be appreciated that the light cam may be alternatively formed, as illustrated in Fig. 4, by the joinder of any pair of mirrors shaped in the form of longitudinal cylinder segments such as the mirrors 9' and 10' of a light cam 8' of Fig. 4.

The light cam 8 is located so that its longitudinal dimension is parallel to the plane of deflection of the incident light beam reflected from the galvanometer mirror; and is supported for rotation about a longitudinal axis parallel to the longitudinal elements of the two cylinder segments 9 and 10 and located midway between the joined portion of the mirrors by such means as an axle or shaft 14. Stated another way, the two cylinder segments are equally offset in opposite directions at right angles to the longitudinal axis of rotation, as shown, for example, in Fig. 3, wherein the midpoint 21 of the chord of a circle formed by the end view of cylinder segment 9 is displaced to the right of the axis of rotation formed by axle 14, and the midpoint 21 of the chord of cylinder segment 10 is displaced equally to the left of axle 14. The light cam 8 is revolved at a predetermined constant speed by any suitable propulsion means such as a motor 15. A light sensitive plate or screen 16 which may, for example, be a recording film or a light diffusing viewing screen, is arranged to receive the moving light beam redeflected by the rotation of the light cam 8. A lens 17 having a light divergent characteristic at one end is preferably interposed between the screen 16 and the light cam 8' in a position intercepting the light beam redeflected from the cam as illustrated. It will be appreciated, of course, that the convergent lens 7 is constructed to have a focal length such that the narrow ribbon beam of light reflected from the galvanometer mirror will be focused, after redeflection from the light cam 8 and transmittal through lens 17, as a fine spot upon the light sensitive screen 16. The function of the divergent lens 17 will be explained hereinafter.

The operation of the above described oscillograph optical system can best be understood by reference to Fig. 3 where a typical time base deflection caused by the rotation of the light cam 8 is plotted for various angular positions of the cam. Referring to Fig. 3, the deflections of the light beam reflected from the galvanometer mirror 5 and represented by the line 4 lies within a plane of deflection perpendicular to the page. Assuming that the galvanometer mirror 5 is held motionless, the reflected light beam 4 impinges on the light cam 8 at a point 18. The angle with which this impinging light beam will be reflected is, of course, dependent upon the curvature of the light cam mirror 9 at the point of incidence 18 and may be determined by reference to a tangent 19 drawn to the mirror surface at that point 18. The angle of reflectance, $r$, will then be equal to the angle of incidence, $i$, as indicated. As the light cam 8 is rotated in a particular direction, such as counterclockwise, the slope of the tangent 19 is continually changing and the impinging light beam is reflected with continually changing angles of reflectance so that it sweeps across the screen 16 in a direction opposite the rotation of the cam.

If the galvanometer is oscillated in accordance with a varying input voltage, a corresponding varying trace will be delineated upon the screen 16 with reference to a time base as illustrated by curve 20 in Fig. 1 for a simple sinusoidal input voltage.

In Fig. 1 the position of the light beam as redeflected from the forward or leading portion of one of the light cam mirrors 9 as indicated, while Fig. 2 indicates the position of this light beam when redeflected from the rearward or following end of the mirror 9. It will be appreciated that as the light cam is rotated beyond the position indicated in Fig. 2, the mirror 10 will assume the position of the mirror 9 in Fig. 1 and the redeflected beam will fly instantaneously back to its initial position at the beginning of the trace.

It is evident that the plane of deflection of the light beam 4 reflected from the galvanometer mirror may be arranged to impinge upon the light cam in a manner parallel to the longitudinal axis of the cam from many different angular directions. This "reference angle of incidence" of the plane of deflection with respect to the light cam may be defined as the angle $\alpha$ formed between the plane of deflection and a plane extending from a longitudinal center line 21 on the back of either mirror through the point of incidence 18 when the back of the mirror is parallel to the plane of deflection. In Fig. 3 the plane of deflection is illustrated as impinging upon the light cam 8 with a reference angle of incidence $\alpha$ of 45°; and the time base reflection resulting from the rotation of the light cam 8 about its central axle 14 is plotted along a screen 16 which is located parallel to the plane of deflection, for rotational angles in increments of 22½° from 0 to 112°. As indicated by the deflection lines corresponding to the rotational angles of 90° and 112°, the rate of deflection becomes slightly slower as the rearward portion of the mirror 9 passes through the incident light beam. This non-linearity is easily corrected by the lens 17 as indicated.

It will be apparent to those skilled in the art that by varying the various optical parameters in this system, the time base deflection can be easily adjusted to cover different ranges of deflection and to provide a linear or non-linear time base, as desired, upon many different screens of various sizes and configurations. By decreasing the reference angle of incidence, for example, the scale of time base deflection is compressed, its linearity is improved and its entire range of deflection is shifted toward the incident light beam. By increasing the amount that the center line of each mirror is offset from the axis of rotation, the scale of deflection is considerably expanded and by utilizing mirrors shaped in the form of small cylinder segments, as illustrated in Fig. 4, rather than half cylinders, as illustrated in Fig. 3, the scale of deflection may be contracted and the linearity of the resultant time base improved. It will also be appreciated that the lens 17 may assume various configurations and that the screen 16 may be positioned in planes other than parallel to the plane of deflection or may be constructed to be curved rather than flat in order to compensate for any non-linearity in the resultant time base deflection.

While the present invention has been described by reference to particular embodiments thereof, it will be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. In an optical type oscillograph employing a light beam, a mirror arranged to intercept and reflect said light beam, means to oscillate said mirror in accordance with a signal voltage to deflect said light beam within a predetermined plane, and a light cam for providing substantially linear and periodically reproduced deflection of said reflected light beam comprising two identical longitudinal cylinder segments having light-reflecting curved surfaces, said segments being joined back-to-back along the flat or chord surfaces thereof, and means for rotating said joined segments at a uniform angular velocity about an axis parallel to the longitudinal elements of said segments, said segments being equally and oppositely offset from, and in directions at right angles to, said axis of rotation, said light cam being arranged to intercept said reflected light beam with its axis of rotation parallel to said predetermined plane of deflection.

2. In an optical type oscillograph employing a light beam, a mirror arranged to intercept and reflect said light beam, means to oscillate said mirror in accordance with a signal voltage to deflect said light beam within a predetermined plane, and a light cam for deflecting said reflected light beam to provide a periodically repeating and time-linear sweep of said reflected beam comprising two identical half cylinders having mirrored curved surfaces, said half cylinders being positioned in back-to-back relation along the flat surfaces thereof with the geometrical axes thereof parallel but not coincident, said half cylinders being mounted for rotation on a common shaft therebetween, the geometrical axes of said half cylinders being equally displaced in respectively opposite directions at right angles to said shaft, said light cam being arranged to intercept said reflected beam with its axis of rotation parallel to said predetermined plane of deflection, and motive means for rotating said shaft at uniform angular velocity.

References Cited in the file of this patent

UNITED STATES PATENTS

| Number | Name | Date |
|---|---|---|
| 815,831 | Hornauer | Mar. 20, 1906 |
| 1,787,920 | Watson | Jan. 6, 1931 |
| 1,913,200 | Hathaway | June 6, 1933 |
| 1,942,059 | Hathaway | Jan. 2, 1934 |
| 2,010,307 | Leishman | Aug. 6, 1935 |
| 2,073,637 | Hoorn | Mar. 16, 1937 |
| 2,253,795 | List | Aug. 26, 1941 |

FOREIGN PATENTS

| Number | Country | Date |
|---|---|---|
| 289,883 | Germany | Jan. 24, 1916 |
| 472,417 | Great Britain | Sept. 23, 1937 |